United States Patent [19]

Roffelsen

[11] 4,027,691

[45] June 7, 1977

[54] DEVICE FOR VENTING AND AERATING CLOSED CIRCULATORY WATER FLOW SYSTEMS

[75] Inventor: Franciscus Roffelsen, NL Helmond, Netherlands

[73] Assignee: N.V. Spiro Research, Helmond, Netherlands

[22] Filed: May 28, 1975

[21] Appl. No.: 581,662

Related U.S. Application Data

[60] Continuation-in-part of Ser. No. 526,314, Nov. 22, 1974, abandoned, which is a division of Ser. No. 321,970, Jan. 8, 1973.

[30] Foreign Application Priority Data

Jan. 8, 1972 Germany .......................... 2200904

[52] U.S. Cl. ............................... 137/202; 55/165; 137/505.46; 137/543.17
[51] Int. Cl.² .......................................... F16K 45/02
[58] Field of Search .............. 55/46, 159, 178, 165; 137/202, 505.46, 543.17, 409, 448, 537; 210/188, 218; 251/DIG. 3, 298

[56] References Cited

UNITED STATES PATENTS

| | | | |
|---|---|---|---|
| 1,075,780 | 10/1913 | Gibbons | 137/202 X |
| 2,106,512 | 1/1938 | Woolley | 137/202 |
| 2,518,387 | 8/1950 | Shaw | 137/537 X |
| 2,638,925 | 5/1953 | Monahan | 251/DIG. 3 |
| 2,745,511 | 5/1956 | Berck | 137/202 X |
| 2,898,930 | 8/1959 | St. Clair et al. | 137/505.46 X |
| 3,077,206 | 2/1963 | Graham | 251/DIG. 3 |
| 3,168,103 | 2/1965 | Kochaver | 137/202 |
| 3,342,207 | 9/1967 | Ross | 137/448 |
| 3,586,032 | 6/1971 | Weinstein | 137/202 |
| 3,662,781 | 5/1972 | Figliola et al. | 137/543.17 |
| 3,768,504 | 10/1973 | Rentsch, Jr. | 137/409 |

*Primary Examiner*—Frank A. Spear, Jr.
*Assistant Examiner*—Robert H. Spitzer
*Attorney, Agent, or Firm*—Toren, McGeady and Stanger

[57] ABSTRACT

A venting and aerating arrangement for closed flow systems for water of fluctuating temperature is disclosed. A vent casing, defining an air collecting chamber, extends upwardly from a horizontal conduit of the system. A float controlled vent valve is arranged in the upper portion of the casing. A grid of spaced rods is arranged in the junction between casing and conduit and extends into the flow passage of the conduit to break up bubbles of air and other gases with the liberated gas ascending into the air collecting chamber. An improved valve construction is also disclosed. The valve has an exteriorly threaded valve body with an axially extending flow passage. A first axial extension on the valve body has a smaller diameter than the valve body proper. The valve body has a plane end surface forming a valve seat surrounding the flow passage. An exteriorly threaded cylindrical closure body of the same diameter as the valve body and having a second axial extension of smaller diameter is included in the valve. A spring engages the threads of the valve body and closure body to urge the end surface of the closure body against the valve seat. The closure body is adjustable relative to the valve body for adjusting spring tension and valve operational limits.

7 Claims, 9 Drawing Figures

DEVICE FOR VENTING AND AERATING CLOSED CIRCULATORY WATER FLOW SYSTEMS

CROSS-REFERENCE TO RELATED APPLICATIONS

This application is a continuation-in-part of U.S. application Ser. No. 526,314, filed on Nov. 22, 1974, now abandoned, which in turn, was a divisional of application Ser. No. 321,970, filed on Jan. 8, 1973.

FIELD OF INVENTION

The invention relates to automatic arrangements for venting and aerating closed flow or conduit systems (hereinafter systems) which are operatively connected to a pressurized water supply container (accumulator), and through which water of fluctuating temperature is circulated by a pump or the like. The invention is particularly directed to such arrangements wherein an air collecting vessel is arranged at the upper end of a conduit tap of the system which tap extends upwardly from a horizontal or lying conduit portion of the circulatory system with a float-controlled discharge or vent valve establishing communication between this vessel and the outer or ambient air. Such arrangements are widely used, for example, in heating systems for apartment houses and the like.

BACKGROUND INFORMATION

The primary purpose of such arrangements is to permit the necessary air exchange between the water containing flow space of the system and the outside during filling and emptying of the system and when thermally caused volume changes take place in circulating water. Further, such arrangements are also intended to collect and separate air residues, which have remained in the system, and other gases which have been formed during the operation of the system, which air residues and other gases are carried along by the circulating water in the form of bubbles of different sizes.

Prior art arrangements of this kind are sometimes referred to as "de-aerators" and comprise a valve which is arranged at the upper end of the air collecting vessel which customarily is in the form of an upright, usually cylindrical, vent tank or receptacle. The closure body of this valve is in these constructions normally held in closing position against the outer air by means of a spring or against a force of a spring. When the water in the air collecting vessel drops below a predetermined level, the closure body of the valve is opened by a float, which is arranged in the vessel and connected to the valve. In order to connect the vent casing of the arrangement which forms the air collecting vessel, with the flow conduit of the system, a threaded pipe or nipple is arranged at the outer face of the casing bottom. The threaded nipple is screwed into a complementary threaded bore of a horizontally extending conduit section of the circulatory system. The inner cross-section of this threaded pipe or nipple is not only substantially smaller than the cross-section of the air collecting vessel but is necessarily also substantially smaller than the inner cross-section of that portion of the circulatory system which is to be connected with the atmosphere through the valve. The threaded pipes or nipples are for this reason on the exterior always provided with pipe threads of ⅛ inch and only in exceptional cases with larger threads of at the most ⅜ inch. This means that the flow cross section of the threaded pipes is always considerably below 1 cm$^2$ while, customarily the flow cross section amounts to but several mm$^2$.

Such prior art de-aerators generally fulfill their intended purpose satisfactorily during filling and emptying of the system, as well as during larger volume changes of the circulating water, by permitting an unobstructed exchange of air between the flow space of the system and the ambient or outer air, provided they are arranged at the highest point of the system. If they are thus arranged, the de-aerators serve at the same time as level controllers for the entire system if the system is connected to a supply container which holds pressurized water (accumulator) and maintains the volume of the water circulating through the system constant. During the operation of the system such de-aerator permit, however, the discharge of air and other gases which circulate with the operating water, only in respect of that air and those gases which have been effectively separated from the operating water and have been able to collect in the casing of the device above the water level, to wit, in the air collecting vessel or space.

Experience and extensive tests have, however, confirmed that successful operation of such de-aerators of the kind previously indicated, is at best possible for a relatively short operational period only, to wit, for the period during which the operating water maintains the characteristics of freshly filled tap water. The chemicals which are often added to the circulating water in heating systems and which are intended to dissolve calcium salts and to inhibit corrosion, significantly change the viscosity and surface tension of the water to such an extent that air and other gases which rise within the water, can no longer exit or penetrate through the surface of the water in unobstructed manner. The air and gases rather form bubbles at the water surface which in many instances are encased by a liquid skin which can be destroyed or ruptured with great difficulty only. This phenomenon increases the more extraneous substances are gradually taken up by the water from the conduit walls and their connecting or junction areas. The water then increasingly assumes the characteristics of an emulsion or colloidal liquid. This in turn results in the fact that below the apex of horizontal conduit pipes, bubbles, which are carried along by the relatively rapidly flowing water, pass by the junction areas of the prior art de-aerators without any exchange taking place between the gas contained in the bubbles and the water contained in the casing of the de-aerating device. This phenomenon increases and is aggravated after some time, since during passage of the operating water through the pump, bubbles, which initially were of relatively large size, are increasingly divided and thus made smaller and thereby better distributed within the water body, until a more or less viscous foam is formed which again does not reach the casing or air collecting space of the device. As a matter of fact, and as is well known from experience, larger foam concentrations, which are carried along by the circulating water, may cause serious operational disturbances. Thus, for example, when the pump rotor rotates within the foam concentrations, the speed of the rotor will suddenly increase with the result that the pump motor runs out of control. The pump then stops the water circulation and ultimately, due to dry run of the water lubricated bearings, both pump and motor are destroyed. This danger is particularly great in modern apartment heating systems, in which the pump oftentimes is arranged at the highest point of the circulatory system, a point which is particularly favorable for the collection of air in the pump space.

SUMMARY OF THE INVENTION

The primary object of the present invention is to provide an arrangement for the venting and aerating of closed circulatory flow systems of the indicated kind for water of fluctuating temperature, which arrangement, also after a long operational period, assures the continuous and effective removal into the atmosphere of gases, also in the form of foam, which are carried along by the operating water. For this purpose, it is necessary not only carefully to separate the gas from the circulating water but also to make sure that the separated gases are transferred into the casing of the de-aerating device which forms the air collecting vessel. Further, it is necessary to employ a venting or de-aerating valve with very short response time, which safely prevents the rise of the water in the de-aerating casing above the level determined by the float and up to the valve under all circumstances. In this manner, deposits and sediments in the region of the valve opening, at the valve seat and the closure body of the valve by corrosion and contaminants carried along by the water are effectively avoided.

Briefly, and in accordance with the invention, the above objects are obtained in an arrangement of the kind previously described, by providing a grid of fine rods or wire below the junction between the horizontal conduit section and the upwardly extending casing of the device, which grid extends at least over the upper portion of the inner cross-sectional area of the conduit section of the system connected to the casing.

Comparatively wide gaps or spaces between the individual rods of the grid, as well as the grid-free space in the conduit section below the grid, assure a practically undisturbed water circulation. The rods on the other hand, which, for example, may consist of thin wire, of a grid portion which is positioned in front of the entry passage into the venting tap, extend into the circulating water in the conduit section, and "cut up" or break up the water layers surrounding the bubbles which impinge on the rods, so that the gas liberated from the bubbles can more readily ascend behind the grid into the air collecting vessel or casing and, through the water in the casing, up to and beyond the water surface. The ascent of the gases is facilitated by the delayed flow velocity of the circulating water in the region of the grid, and can be further improved by shaping the grid in a suitable manner. Further, the rising of the gases can be facilitated by providing a grid or grid portion in the venting casing proper, to wit, above the junction between casing and conduit section.

Grid formations and arrangements are also feasible that facilitate the rising of the bubbles in that the grids offer the circulating water a lesser resistance while the resistance offered to the gas bubbles carried along by the water is, by contrast, greater.

However, experiments have indicated that sieve-like grids which are made from perforated plates or which are formed from crossing or intersecting rods or wires, are unsuitable, because neither larger gas bubbles nor foam penetrate then through the grid openings. Further, the grid openings are soon clogged by solid matter and other deposits which are carried along by the operating water. Moreover, grids of very narrow mesh size or grids which have become completely impermeable, lead to a damming of the water which may seriously affect the function and operation of a heating plant.

Extensive experiments and tests have indicated that grids, whose rods form the boundary of free passage-forming gaps or slots, are superiorly suitable, not only to dissolve larger bubbles and to separate them at an early stage, but also to separate viscous foam composed of fine bubbles, at least upon repeated passage through the grids. Such grids are capable of separating the larger bubbles and the foam from the operating water in a quantitative manner and to cause the rise of the resulting air or the like gas through the water and into the air collecting vessel of the casing of the device.

The grid acts the quicker and the better, the wider the junction zone from the conduit to the casing and the farther the grid extends over the inner cross section of the conduit section. The diameter of the junction opening should not be so small that the tap casing exerts the action of a pipette, in which the surface tension of operating water contained therein prevents the penetration of pressureless gas, which is influenced by its own buoyancy only, through the downwardly situated junction opening into the casing. This is in contrast to the constructions of known de-aerators previously referred to. In order to prevent the pipette effect referred to, the diameter of a circular junction passage opening should not be smaller than about 10 mm. This condition can be met in prior art de-aerators only if the securing area between casing and conduit section the inner diameter of the conduit section is substantially larger than the diameter of the connecting thread. However, even in the latter case, a grid which is secured at the threaded pipe or nipple of the device could only traverse a relatively small portion of the cross-sectional area of the conduit section. This means that substantial quantities of operating water would flow laterally past the grid without contacting the grid and the complete elimination of the carried-along gas quantities would then be dependent on the more or less incidental striking of the gas bubbles against the relatively narrow grid. The removal of gases would thus take a very long time and would not be very effective.

In order to overcome this disadvantage and to obtain an arrangement which is reliable under all operating conditions, the invention also provides that the inner cross-section of the tap or venting casing of the device is larger than the cross-section of the conduit section and that the conduit section is connected at the casing from opposing sides. In such a construction there is complete freedom in respect of the shaping and arrangement of the grid and the grid can be made so large that it extends over the complete cross-sectional area of the conduit section, primarily in horizontal direction. The grid need only project to about one half of the depth of the flow of the circulating water in order to achieve that the gas bubbles, which preferably are carried along in the respective upper portion of the water, impinge on the grid and the water is only dammed or obstructed in this region to an insignificant extent.

As is apparent from the above, the details of the configuration and arrangement of the grid are dependent on the construction and configuration of the system in general. A grid which is secured to a vent casing with threaded nipple and which is thus inserted through the nipple into the conduit section of the system, has advantageously the shape of an upwardly open, hollow cylinder with rods that are arranged parallel to the thread axis and held between two rings. The grid, however, may also have the shape of a wire helix, whose axis is situated in the thread axis and whose individual turns form the "rods" of the grid.

In arrangements having conduit sections connected laterally to the vent casing of the device, the grid, while basically having the same shape, may also have substantially larger diameter, or the grid may have, for example, the shape of an upwardly open basket which is suspended into the circulating operating water. The rods of this basket extend, preferably in flow direction, between opposing areas of the upper rim in arc-shaped manner or over bending or buckling areas through the operating water. The shape of a wire helix in this case is also feasible, which helix is wound in screw formation on a carrier tube or mandril, the latter being arranged in the axis of the vent casing of the device and the windings or turns of the helix extending laterally in the casing to a position closely adjacent the casing wall and, in respect to height dimension, to a position closely adjacent below or even above the water level.

Experiments which have been carried out in a test plant with transparent conduit section and casing walls have indicated that in respect to the last-mentioned embodiment, bubbles and foam concentrations which have reached up to the lower end of the wire helix, have a tendency easily to penetrate into the helix but do no longer exit from the helix. Rather the gases liberated from the bubbles follow the turns of the helix and rise to the surface of the water contained in the casing. With such a configuration of the grid, a portion of the inner wall of the lower mandril or carrier tube end, which projects beyond the wire helix in a direction opposite to the flow direction of the water, may be exposed by inclined cutting to form a catching surface for water which carries bubbles and foam. In this manner the last-mentioned water, due to the pressure of the trailing water body and supported by the buoyancy of occluded gases, is driven upwardly within the carrier tube or mandril.

The upper portion of the carrier tube or mandril is, moreover, suitable for centering and guiding a lower part or projection of the float or of a complete, rod-like float.

In order to maintain the inventive venting device operational and functional for a practically unlimited period of time, the invention proposes a novel venting valve which is responsive to minimal float movements, to wit, it is responsive to very small fluctuations of the water column which supports the float, without any delay whatsoever.

In this manner a construction is achieved in which, also with small air spaces above the water column in the casing, the water under no circumstances contacts any portions of the valve. This is necessary so that valve portions, which are responsible for the functioning of the valve, are not subjected to frequent alternating influence of water and air which would lead to corrosion and deposits. Further, contaminations carried along by the water thus do not contact the valve.

The above requirements are superiorly met by a float-controlled valve which consists of conventional structure and new structure. The conventional structure of the float controlled valve comprises a cylindrical valve body which, in known manner, is insertable into an opening of the vent casing of the device. A ring or annular surface forms the valve seat and surrounds the inner mouth opening of an axial flow channel. Further, in conventional manner, a closure body is provided which is urged against the valve seat by a spring. The inventive structure which renders the fulfillment of the above requirements possible, is that the valve body forms the valve seat with the plane end face of an inwardly directed axial first extension of smaller diameter, that the closure body, which also consists of a cylindrical body of the same diameter, bears with the plane end surface of a second extension of smaller diameter against the valve seat under the force of the turns of a tension spring, the turns of the tension spring being tensioned in the region of the facing first and second extensions, the tension spring being screwed on the threaded outer surfaces of the valve body and the closure body, and that the float engages the closure body directly at that end which faces away from the valve seat.

In known valves a rocking lever carries the closure body. Due to the particular form and relative connection of the essential valve portions in the inventive valve, the provision of such a rocking lever and its support bearing is not necessary and is thus eliminated. In the inventive valve construction, the descending float causes a tilting of the closure body about the outer edge of the smaller one of the two opposing end faces of valve body and closure body. Due to the elimination of the bearing for the rocking lever, a principal trouble source of the known valves is thus eliminated. Further, the lever arm which is formed by the radius of the smaller end face may, in comparison to the load arm which is determined by the point of engagement of the float, have extremely small dimensions. In this manner, a most reliable functioning of the valve is obtained and also a very short response time. This also holds true if, in the interest of reliable sealing, the exteriorly situated, relatively large valve spring exerts a great force. In order to overcome this great force for the purpose of reliably opening the valve, very small active float weights are sufficient due to the fact that the spring is subjected to bending deformation. The larger the closing force of the spring, the harder may be the sealing contact on the end face of the closure body, and the harder this sealing contact, the smaller is its wear and the smaller is the tilting angle which is required in order to open the valve. Due to the small tilting and the small effective float weight, which is rendered possible by the large lever transmission, the valve responds even to the smallest fluctuations of the water column which carries the float. Thus, very light and hence small floats may successfully be used. Even if the vent casings of the device have relatively small cross-sections, the floats may be constructed as bodies of small height, for example, in the form of relatively thin, flat discs, a construction which further benefits the response precision.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described the preferred embodiments of the invention. IN THE DRAWINGS

FIGS. 3, 4 and 5 show arrangements whose casing, which forms the vent tap of the system, has a larger cross section than the conduit section of the system to which the casing is connected and whose confining wall is provided at opposing areas with connections to the conduit section of the circulatory flow system, wherein in FIG. 3 the grid has a basket-like configuration while in FIG. 4 a flat grid with horizontal rods is arranged obliquely in the flow of the circulating water.

Figure 1:
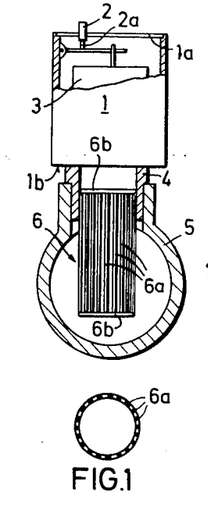
FIG. 1 shows one embodiment of an inventive venting device which, through a threaded nipple, is connected to a horizontal or lying conduit section of a circulatory flow system, as well as a cross-section of the particular grid used in this embodiment.

Referring now to the drawings, the arrangement according to FIG. 1 comprises in known manner a cylindrical vent casing 1. The casing 1 has a cover or lid 1a into which is inserted a valve 2 whose closure body 2a is normally maintained in engagement with its seat. This is accomplished by a force which acts from the inside on the closure body and against the ambient outer air. The arrangement also includes a float 3 which, when the water level in the casing 1 drops below a predetermined level, draws the closure body from its seat and thereby opens the valve against the outer air until the casing 1 is again filled with water from the supply of an accumulator or storage tank (not shown) to reach the predetermined level.

The casing 1 is connected to a horizontal or lying header portion or conduit section 5 of a circulatory flow system. This is accomplished by a threaded nipple 4 which projects downwardly from the casing bottom 1b and which is screwed into a suitable inwardly threaded connecting flange of the conduit section 5. The casing 1 thus extends upright relative to the horizontal conduit section 5. In contrast to known arrangements of this kind, the flow cross-sectional area of the threaded nipple 4 is so large that the casing 1 does not act as a pipette so that air under atmospheric pressure does not prevent operating water in the casing from flowing out when the valve 2 is closed.

A hollow cylindrical grid 6 extends into the conduit seciton through the passage opening or junction between the conduit section 5 and the nipple of the casing 1. This grid 6 is secured at the end of the threaded nipple 4 and consists essentially of a plurality of thin rods 6a which extend parallel to the axis of the nipple. The opposite ends of these rods are connected in spaced relationship to rings 6b, one at each end. In a preferred embodiment, the distances between the rods are advantageously not all equal — as shown — but rather increase from the central vertical axis plane of the conduit 5 towards both sides in such a manner that the projections of the rods onto a transverse plane would have equal distances. In such a construction, however, difficulties may be encountered concerning the alignment of the grid after the device has been screwed into the flow system.

Such difficulties, however, are avoided by using a grid, wherein the rings are arranged generally horizontally as distinguished from the vertial showing of FIG. 1.

Figure 2:
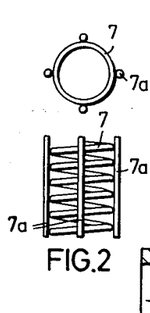
FIG. 2 shows a different embodiment for the grid of the device according to FIG. 1.

FIG. 2 shows a grid embodiment which is similar to the last-mentioned construction. The grid of FIG. 2 may be used in conjunction with the structure for the flow system as shown in FIG. 1. Thus, the grid of FIG. 2 consists of a wire helix 7, whose turns are reinforced or stiffened by a few rods 7a which extend parallel in axial direction and which maintain the turns of the helix at the desired distance.

It will be appreciated that devices with threaded nipples of sufficiently large inner diameter can only be used in connection with systems wherein the respective conduit section of the system has a relatively large diameter and relatively large wall thickness.

Figure 3:
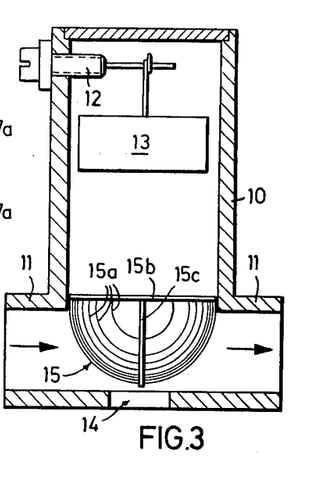
Figure 4:
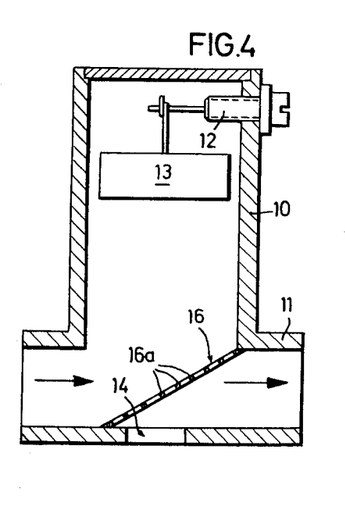
Figure 5:
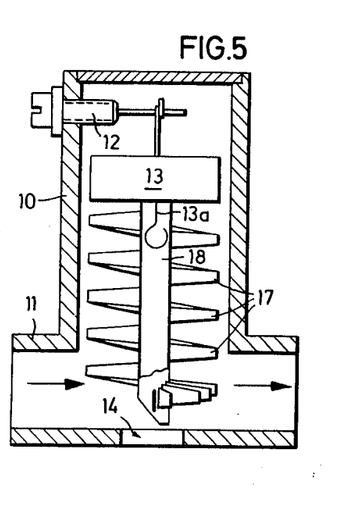
FIG. 5 showing a grid which is a screw-like wire helix or spiral wound on a central support tube or mandril.

For this reason, in the embodiments of FIGS. 3, 4 and 5, the cross-section of the casing 10, which forms the vent tap, is larger than the cross-section of the conduit section 11 of the flow system, the conduit section 11 being integrally connected at opposite areas with the lower portion of the confining wall of the casing 10. The valve 12, which is controlled by the float 13, is here inserted into a bore in the upper portion of the confining wall of the casing 10. An opening 14 in the bottom of the casing 10 serves the purpose to connect a line or conduit to the accumulator or water tank (not shown).

In a manner similar as in the embodiments of FIGS. 1 and 2, the grid may consist of vertical straight rods or of a wire helix with vertical axis, the rods or wire helix extending from above the junction zone between the conduit section and the casing downwardly into the operating water which flows through the system.

In the embodiment of FIG. 3, a basket-shaped grid 15 is suspended from above the junction wherein the line or conduit section 11 opens up into the casing 10. The effective portion of the grid 15 comprises half-rings 15a which are of wire and extend parallel or concentric to each other. The free ends of the half-rings are secured to a horizontally extending ring 15b. Moreover, the basket thus formed is reinforced by a wire stirrup 15c. The basket extends vertically downwardly in the flow direction of the circulating water.

A substantially similar effect is obtained with a basket-like grid composed of complete rings which are horizontally arranged one above the other.

In the embodiment of FIG. 4, a grid 16 is shown which is formed from horizontal rods 16a which extend all in one plane, the grid extending obliquely across the cross-sectional area of the conduit section 11. The grid thus separates the casing 10 from that portion of the conduit 11 which, seen in the flow direction, is located behind the casing. The upper side of the grid 16 opposes the water flow. The thickness of the rods and the distances between the rods are chosen such that the lower apex of each rod and the upper apex of an adjacent lower rod are situated in a horizontal plane. In this manner, gas bubbles, which are carried by the water, are, supported by their buoyancy, deflected upwardly as over a continuous surface, while the water continues to flow through the spaces between the rods with insignificant deflection, to wit, it flows in a straight path without substantial obstruction.

In the embodiment of FIG. 5 the grid comprises several turns of a wire helix 17 with longitudinally-rectangular or trapezoidal-shaped wire windings. These wire turns are wound in screw-like manner onto a carrier tube or mandril 18 and are secured to the outer surface of the mandril.

The turns of the wire helix 17 extend radially substantially further than in the axial direction. The helix 17 occupies with several turns the cross-sectional area of that portion of the casing 10, which is above the junction of the casing with the conduit 11 and projects with one complete turn into the flow region of the circulating water in the conduit section 11.

At the lower end of the mandrel 18 which projects beyond the lower extremity of the wire helix 17, the end wall is partially cut away so that a portion of its inner wall opposed the flow direction of the circulating water, the flow direction being indicated by the arrows.

The upper end of the mandril 18 embraces a lower projection 13a of the float 13, whereby the float can be readily centered in the casing 10. Further, in this manner the float is securely guided during its movement.

Figure 6:
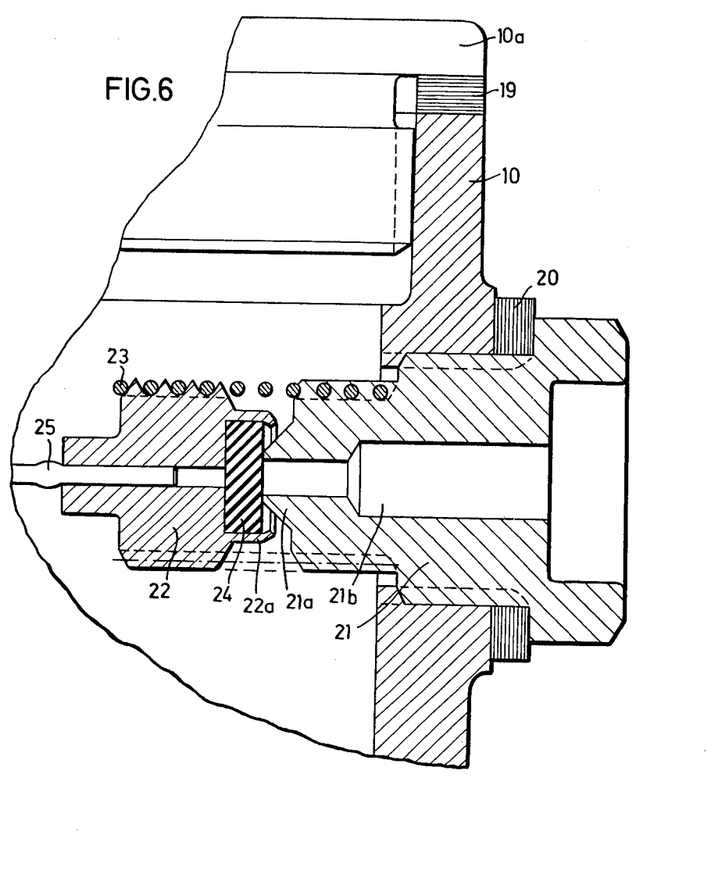
FIG. 6 is a representation of the venting valve of the invention on enlarged scale.

The venting valve of FIG. 6 has been illustrated in enlarged manner for clarity's sake. The valve comprises a cylindrical valve body 21. This valve body 21 is screwed from the outside into an opening of the circumferential wall 10 of the casing with a washer or gasket 20 being interposed. It will be noted that the valve body 21 is situated closely below the casing cover 10a with the gasket 19. The valve moreover comprises the closure body 22 and the valve spring 23. The valve body 21 is inwardly provided with an axial extension 21a of smaller diameter. The end face of this extension 21a surrounds the inner outlet or mouth of the axial flow channel 21b and forms the seat for the closure body 22. This cylindrical closure body 22 has the same diameter as the valve body 21 and is also provided with an extension or abutment 22a of smaller diameter, whose end face is provided with a sealing member 24. The closure members bears with the sealing member 24 against the seat of the valve body 21 when the valve is closed. The closure body 22 is secured at the valve body 21 by means is a coil spring 23. The valve body 21 and the closure body 22 have exteriorly cut threads by means of which they are screwed into the coil spring 23 from both ends to such an extent that after contact of the end faces of their extensions 21a and 22a, the turns of the spring 23, which surround these extensions under a distance, are tensioned.

The spring serves at the same time thus also as a valve spring of adjustable force, as carrier for the valve body and as universal joint for the valve members 21 and 22 connected by the spring. A rod 25, which is inserted into the free end of the closure body 22, serves the purpose to suspend the float which is not shown in FIG. 6. Adjustment of spring force may be made, as is evident from FIG. 6, by turning of the closure body 22 realtive to the valve body 21.

Since the coil spring, which forms the joint between closure body and valve body, has the natural capability to move in any direction and during such movement in any direction the valve would be opened, the float is suspended in such a manner that during its upward movement the closure body 22 is not taken along. Advantageously an abutment is provided at the casing cover 10a which prevents upward movement of the float beyond its idling path.

Since in the above described valve the buoyancy force of the float it not utilized for the closure movement and the effective float weight, to wit, the difference between its specific weight from that of water may be small, the float should not be formed as a hollow body but preferably as a massive, solid body of a material of correspondingly low specific weight. This material should, of course, not have a tendency to absorb water and should retain its shape and form even at temperature fluctuations between 0° and 100° C. Polypropylene is superiorly suitable for this purpose.

By contrast, if hollow floats are used, as is customary in prior art constructions, the danger exists that after prolonged operation that float structure is no longer sufficiently water tight and gradually absorbs water. This, of course, increases the weight of the float until ultimately the valve is no longer closed and exiting water may thus cause considerable damages. This is effectively prevented by using a solid float in accordance with the proposal of this invention.

The valve according to FIG. 6 is excellently suitable for other uses than for exchanging air between a closed pipe system of circulating water of varying temperature and the outside air. It is generally suitable to open or block the way not only of air or any other gas, but also of liquids from one chamber to the other in any direction in dependence on any force directed transverse to its axis. It can also be influenced by means other than by a float moving only vertically up and down.

The valve can also be influenced by a force which acts in the axial direction on the closing body 24 and presses the latter away from its seat on the valve part 21 against the adjustable force of the spring 23.

In this case, an additional source of energy is not necessary, and the pressure of a liquid or gaseous medium, which medium is to be allowed to pass, acting on the closing body from the port 21b can be utilized itself as a controlling force.

Certain applications of the valve of FIG. 6 will now be described.

Figure 7:
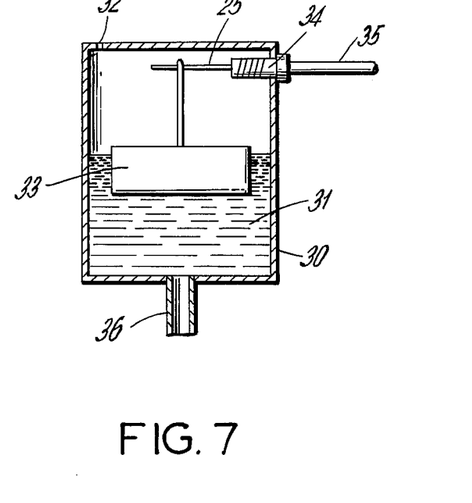
FIG. 7 is a liquid control system or level regulator in partially schematic form employing the valve of FIG. 6.

FIG. 7 shows a level regulator, that is, a valve which maintains or restores a certain volume of a liquid contained in a container or in a pipe system which is open to the outside air. Examples of this type are toilet tanks or the evacuated overflow vessel of a hot water heating system, which is connected by way of the valve to a water pipe and which contains a float as a means for controlling the water supply directly.

In FIG. 7, 30 is the main fluid tank having an opening 32 which is open to the atmosphere. The valve 34, of the type shown in FIG. 6 is disposed in a wall of the tank. A pipe line for fluids 35 is connected to the flow channel of the valve. the tank is filled with a fluid 31 and a fluid controlling float 33 controls fluid flow to a main fluid pipe 36. The float 33 is connected to controlling rod 25 of the valve which is coupled to the closure body of the valve.

Figure 8:
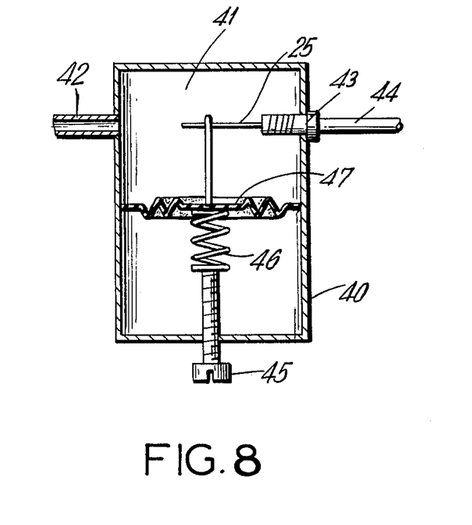
FIG. 8 is a pressure regulator in partially schematic form employing the valve of FIG. 6.

FIG. 8 illustrates an adjustable reducing valve suitable for gases and liquids, which is also as a pressure regulator.

The chamber 41 of the valve housing 40 which is sealed by a diaphragm 47 from the outside air is directly connected to a gas or liquid pipe line 42. The chamber 41 is also connected by way of valve 43 to another gas or liquid pipe line 44. The diaphragm 47 is connected by a bar with the shaft 25 of the valve. When the pressure in chamber 41 is equal to the atmospheric pressure, the valve is closed. If the pressure in chamber 41 differs from the atmospheric pressure upward or downward, the valve is opened until the pressure equilibrium is restored again.

If the diaphragm 47 is loaded in one or the other direction by a tension or compression spring 46 with a force that can be varied by means of an adjusting screw 45, which keeps the valve open in rest position, the valve is closed as soon as the underpressure or overpressure in chamber 41 is equal to the spring force. The pressure in chamber 41 and in the pipe line connected to it can this way be kept constant within very narrow limits.

By limiting the deflections of the valve shaft 25 or of the diaphragm mechanically, it is possible to make the valve respond only to overpressure or only to underpressure.

Figure 9:
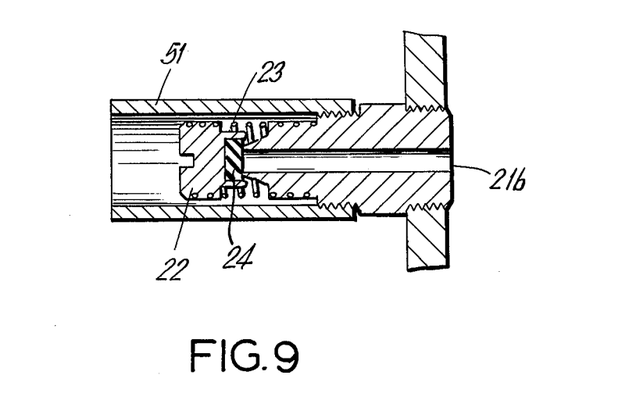
FIG. 9 is an overflow or safety valve arrangement employing the valve of FIG. 6.

FIG. 9 shows the use of the valve according to FIG. 6 as an overpressure or overflow or safety valve for gases and liquids.

If the valve port 21b is connected to a pressure line, for example, behind a pump, the valve opens against the force of the valve spring 23 as soon as the pressure on the closing body 24 exceeds the force of spring 23. By turning the valve body 22 inside the spring 23, it is possible to determine its force, and thus the pressure which must not be exceeded.

The tube 51 serves as a protection for the valve and for the connection of a hose (not shown) to be disposed over the end of tube 51, which hose leads to a collecting vessel for liquid issuing from the valve.

While there have been described and shown different embodiments of the present invention, this specification is intended to cover all the modifications and variations that come within the true spirit and scope of the present invention.

What is claimed is:

1. A vent valve for use in venting devices for closed water flow systems, wherein the valve is arranged on a vent casing which defines an air collecting chamber, said vent casing being connected to a horizontal conduit of the system and extending upwardly therefrom, said valve being capable of establishing communication between said chamber and the outside, the opening and closing of the valve being float-controlled in response to the water level in the casing, said valve consisting of an exteriorly threaded cylindrical valve body with an axially extending flow passage, a first axial extension on said valve body having a smaller diameter than the valve body proper, and having a plane end surface forming a valve seat surrounding said passage, an exteriorly threaded cylindrical closure body of the same diameter as said valve body and having a second axial extension of smaller diameter than said closure body and forming a plane end surface, and a spring engaging in the threads of said exteriorly threaded valve body and closure body and urging the plane end surface of said second extension against said valve seat in a rest position of said valve, said closure body being rotatable relative to said valve body whereby tension of said spring may be adjusted and operating limits of said valve may be preset, wherein said float being connected to said closure body at a point remote from said valve seat and wherein said axially extending flow passage of said valve is arranged to release collected gases outside of said vent casing when said valve is opened.

2. A vent valve as claimed in claim 1, wherein said float is a solid body and a member of yielding material is secured to one of said end surfaces.

3. A valve for use in providing flow control of a fluid system, said valve consisting of:
an exteriorly threaded cylindrical valve body with an axially extending flow passage, a first axial extension on said valve body having a smaller diameter than the valve body proper, and having a plane end surface forming a valve seat surrounding said passage, an exteriorly threaded cylindrical closure body of the same diameter as said valve body and having a second axial extension of smaller diameter than said closure body and forming a plane end surface, and a spring engging in the threads of said exteriorly threaded valve body and closure body and urging the plane end surface of said second extension against said valve set in a rest position, said closure body being rotatable relative to said valve body whereby tension on said spring may be adjusted and the operating limits of said valve may be preset.

4. The valve of claim 3, wherein said valve is for being disposed on a vent casing defining a fluid collecting chamber, said valve for establishing communication between said chamber and the outside, the opening and closing thereof being controlled in response to a fluid condition within said chamber and wherein a connecting element is coupled to said closure body and has a movement responsive to said fluid condition for opening and closing the valves and, in combination with said valve, a liquid control system having a casing, an opening in the top portion of said casing and a fluid outlet in the bottom of the casing, said valve being disposed in a substantially horizontal position in a side wall of the casing, an inlet of said valve being connected to a liquid conduit, said casing containing a quantity of the liquid, the level of which being below the valve, a float being disposed in said fluid and having a float holding member coupled to said connecting element in said valve.

5. The system of claim 4, wherein a spring element is disposed within said casing on the other side of said chamber, said spring being affixed to said diaphragm and an adjustment means is included in said casing for adjusting the force of said spring.

6. The valve of claim 3, wherein said valve is for being disposed on a vent casing defining a fluid collecting chamber, said valve for establishing communication between said chamber and the outside, the opening and closing thereof being controlled in response to a fluid condition within said chamber and wherein a connecting element is coupled to said closure body and has a movement responsive to said fluid condition for opening and closing the valve and in combination with said valve, a fluid control system having a casing, a pressure-sensitive diaphragm extending across said casing forming a chamber, on one side thereof, a fluid condhit coupled to a wall of said casing surrounding the chamber, said valve being disposed in a wall of said casing surrounding the chamber, said diaphragm being connected to said connecting element of said valve.

7. The valve of claim 3, wherein said valve is for being disposed on a vent casing defining a fluid collecting chamber, said valve for establishing communication between said chamber and the outside, the opening and closing thereof being controlled in response to a fluid condition within said chamber and wherein a connecting element is coupled to said closure body and has a movement responsive to said fluid condition for opening and closing the valves and in combination with said valve, a safety valve system for gases and liquids including means for mounting the valve, means for connecting the valve flow passage to a closed fluid system having a pressure predetermined by relative adjustment of said valve body and spring, said valve being adjusted when connected so as to open at a pressure above said predetermined pressure and protective means disposed over said valve seat for coupling fluid emanating from said valve to a collecting vessel.

* * * * *

UNITED STATES PATENT OFFICE
CERTIFICATE OF CORRECTION

Patent No. 4,027,691     Dated June 7, 1977

Inventor(s) Franciscus Roffelsen

It is certified that error appears in the above-identified patent and that said Letters Patent are hereby corrected as shown below:

In the heading of the patent [30] should read as follows:

--[30] Foreign Application Priority Data

Jan. 8, 1972    Germany .......... 22 00 904
    Dec. 8, 1972    Germany.......... 22 60 349 --.

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*